May 12, 1925.
S. R. BERGMAN
ALTERNATING CURRENT COMMUTATOR MOTOR
1,537,737
Filed July 3, 1922   2 Sheets-Sheet 1
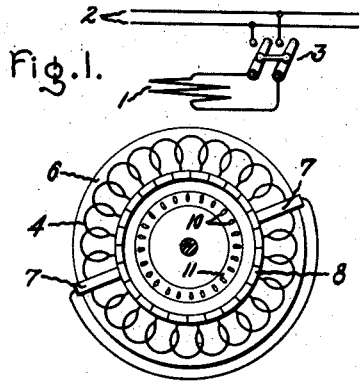
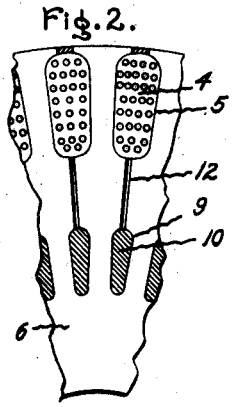
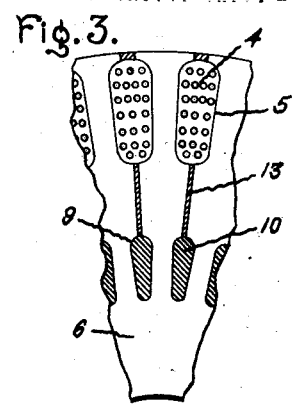
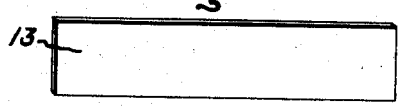
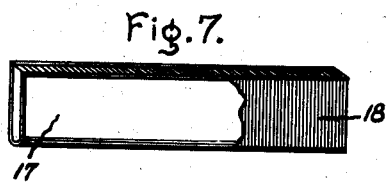
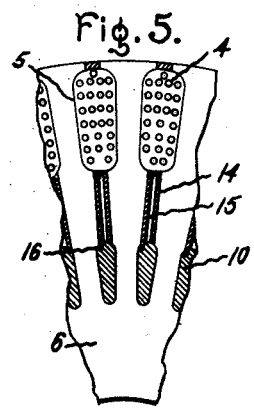
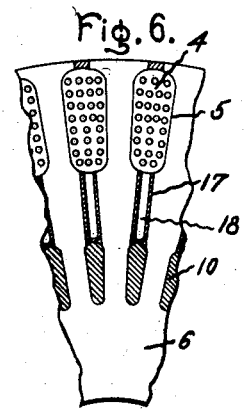
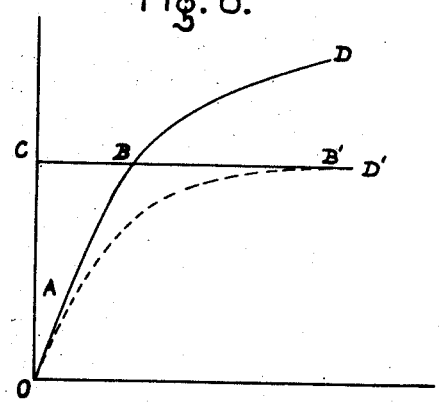
Inventor:
Sven R. Bergman,
by Albert S. Davis
His Attorney.

May 12, 1925.
S. R. BERGMAN
1,537,737
ALTERNATING CURRENT COMMUTATOR MOTOR
Filed July 3, 1922   2 Sheets-Sheet 2
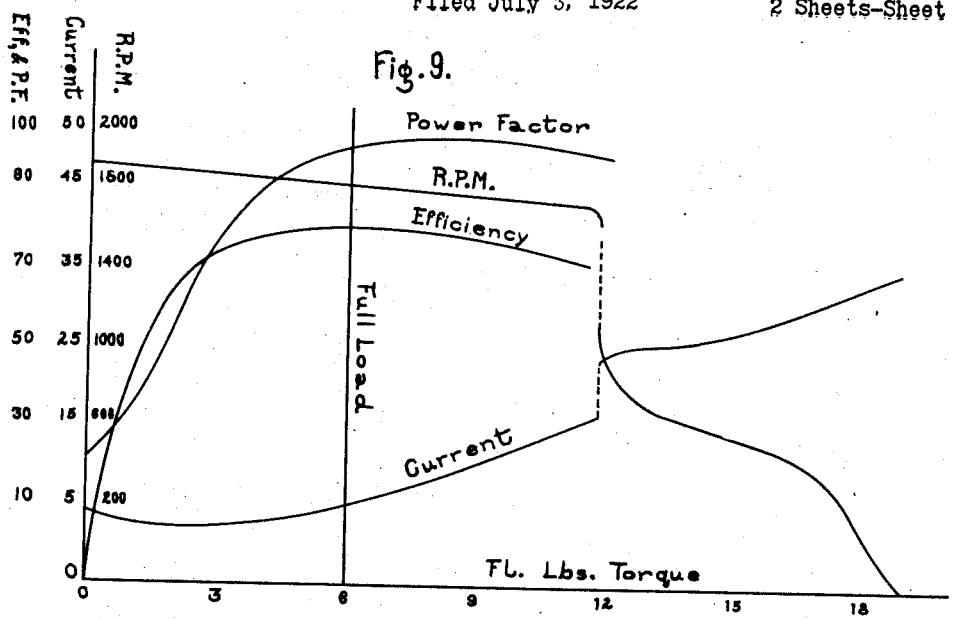
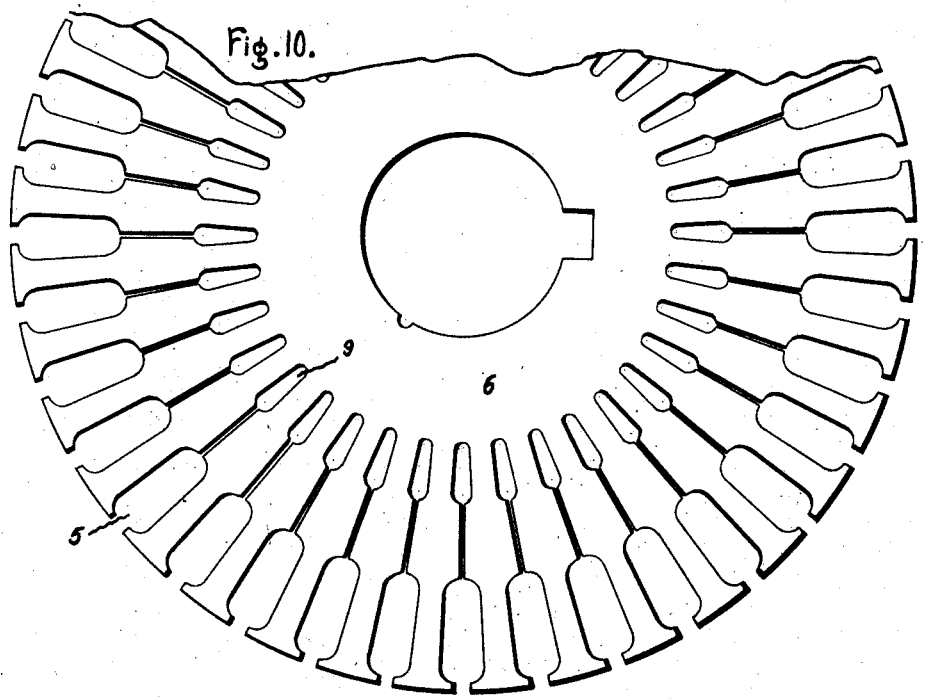
Inventor:
Sven R. Bergman,
by *Albert S. Davis*
His Attorney.

Patented May 12, 1925.

1,537,737

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ALTERNATING-CURRENT COMMUTATOR MOTOR.

Application filed July 3, 1922. Serial No. 572,514.

*To all whom it may concern:*

Be it known that I, SVEN R. BERGMAN, a subject of the King of Sweden, residing at Nahant, in the county of Essex, State of Massachusetts, have invented certain new and useful Improvements in Alternating-Current Commutator Motors, of which the following is a specification.

My invention relates to alternating current dynamo electric machines and more particularly to the induced members of alternating current motors having a squirrel cage winding or its equivalent together with a commutated winding.

My invention has for its main object to produce a more improved motor of its class as regards the relation between starting and running characteristics. My invention also contemplates improvements in the induced members of motors of this type as regards simplicity of construction and a more complete utilization of available space. Where the requirements of design or duty of my improved motor are such as to make commutation a limiting factor, I also prefer to include a very simple expedient for correcting the same.

The design of an alternating current commutator motor in which desirable starting and running characteristics are present in substantially the same degree as such characteristics have heretofore been obtained in separate motors, is by no means a simple problem principally because the heretofore recognized principles of design for obtaining good starting characteristics in this type of motor have been contrary to those for obtaining good running characteristics and vice versa. The principles of operation of my invention are best utilized and more readily explained in connection with single phase commutator motors although I consider that certain aspects of my invention are also applicable to alternating current commutator machines in general. I shall therefore explain my invention in connection with a single phase commutator motor with the intention of limiting my invention to such a motor only in so far as the principles of operation thereof are not applicable to other types of dynamo electric machines.

The features of my invention which I believe to be novel and patentable will be pointed out in the claims appended hereto. The theory of operation as it is now understood and the preferred design of my improved motor will now be explained in connection with the accompanying drawings in which—

Fig. 1 diagrammatically represents the electrical connections of a motor to which my invention may be applied; Fig. 2 illustrates the preferred arrangement of the rotor slots and windings of my improved motor; Fig. 3 illustrates the arrangement of Fig. 2 in which a high resistance conductor is provided between the rotor windings for improving commutation; Fig. 4 shows the high resistance conductor of Fig. 3 removed; Figs. 5 and 6 illustrate alternative arrangements of the rotor structure by means of which my invention may be carried out; Fig. 7 shows a portion of the rotor structure of Fig. 6 removed from the rotor; Fig. 8 is a curve descriptive of the magnetic theory pertaining to my motor; Fig. 9 shows characteristic curves of my improved motor; and Fig. 10 illustrates a portion of a complete rotor lamination used in the motor from which the curves of Fig. 9 were obtained.

Referring now to the drawings in which like parts are designated by like reference numerals, Fig. 1 illustrates the wiring diagram of the usual single phase repulsion motor on which there is provided a squirrel cage winding beneath the commutated winding. The stator is wound with a single distributed polar winding of the usual variety, diagrammatically represented at 1. This winding is adapted to be connected to a source of single phase alternating current such as by line wires 2 and switch 3 for energizing the motor. The rotor is provided with a distributed commutated winding 4 of the usual type situated in peripheral slots 5 of the laminated core 6. The brushes 7 on the commutator 8 are shifted out of the neutral axis of the stator winding and are short-circuited substantially as illustrated. Located in separate slots 9 beneath the commutated winding slots 5 there is provided a squirrel cage winding consisting of bars 10 and end rings 11, the numbers of slots for the two windings being preferably the same.

It is a well-known fact that the plain repulsion motor has excellent starting characteristics but it has very poor speed regulation. The speed regulation of such motors has heretofore been improved to some extent by the provision of a squirrel cage winding situated beneath the commutated winding. This improvement has been obtained however by destroying to a considerable extent the desirable starting characteristics of the plain repulsion motor. In my improved motor both the desirable starting and running characteristics above mentioned are obtained.

In carrying my invention into effect I design the flux path between the commutated and squirrel cage windings of sufficient flux carrying capacity that the current in the squirrel cage winding at starting causes the major portion of the normal rotor flux to pass through this path without excessively saturating the same; whereby the conditions for producing the desirable starting characteristics heretofore obtained in the plain repulsion motor are not seriously affected. Also, I make this flux path between the two rotor windings of such reluctance that during normal operation sufficient flux is caused to thread the squirrel cage winding to produce in the motor the desired substantially constant speed running characteristics heretofore obtained with the plain induction motor. Furthermore, I make the resistance of my squirrel cage so low as compared to its reactance that whatever currents are induced in it at starting are of such phase relation with respect to the stator currents as not to appreciably shift the time phase of the flux in the rotor from the maximum torque producing position, and that the currents produced in the squirrel cage winding during normal operation have a compensating effect in increasing the power factor of the motor. A low resistance of the squirrel cage winding is also desirable to secure good speed regulation. Preferably the copper section of the commutated winding of my improved motor is made only about three-fourths as great as in a corresponding repulsion motor without a squirrel cage for the purpose of obtaining the most desirable distribution of the load current between the two rotor windings. This relation, however, does not affect the underlying principles of my invention. The commutation of such a motor is considerably better than in the ordinary repulsion motor due partially to the relatively lower current which it is necessary to commutate and partially to the presence of the squirrel cage. In some instances it may be desirable to provide means for perfecting the commutation to a still higher degree and this may be done by means of eddy current conductors placed parallel with the commutated winding. When used these eddy current conductors are so designed that they are appreciably responsive only to flux pulsations having frequencies above those of the slip and double line frequency flux pulsations which are characteristically present in such single phase motors. Since the range of frequency of the flux pulsations incident to commutation is considerably above double line frequency, the commutation may be improved in this way without impairing the other desirable characteristics of the motor and the losses which would otherwise be produced in the eddy current conductors by the lower frequency flux pulsations are likewise avoided. Finally, the mechanical design of my improved motor is simple and rugged and the available rotor space is utilized in a very efficient manner ensuring a low first cost and a long life. Having thus outlined the principal features of my improved motor, I will now proceed to explain them in detail:

I prefer to use a single distributed stator winding 1, like that of a single phase induction motor on account of its simplicity, low cost, ease of repair and good electrical characteristics. The fundamental principles of my invention are generally applicable however to all single and polyphase commutator motors having connections which give series starting characteristics and it is intended to cover all such constructions in certain of the appended claims. There is no need, however, for any auxiliary stator winding for compensating or starting purposes as the motor is inherently compensated for power factor and has an inherently high starting torque. The distributed commutated winding 4 with the short circuited brushes 7 is used to secure the advantages of the starting characteristics of the ordinary repulsion motor. A series connection of stator and rotor could also be used but this would give certain less desirable characteristics and would impose additional requirements on the insulation and number of turns used in the commutated winding. The squirrel cage winding consisting of bars 10 and end rings 11 is made of the lowest possible resistance permissible with the given amount of space and the present manufacturing methods for two reasons, first to secure good speed regulation and good efficiency for normal operation, and second, to make the squirrel cage starting impedance as nearly purely reactive as possible to thereby obtain the most favorable phase relations between the squirrel cage starting current and rotor flux and therefore the best possible starting torque and operating power factor. Owing to the relatively small diameter of the squirrel cage winding as compared to the diameter of the rotor, the length of the current path and therefore the resistance in the end rings is reduced to a minimum. Preferably the numbers of slots 5 and 9 for the two rotor windings are made the same and are situated on the same radial lines in order to obtain the best utilization of available space consistent with the requirements hereinafter described and to enable the arrangement for improving commutation to be carried out when desirable. The essential features of design of my improved motor may also be obtained by other arrangements and relations of the two sets of slots in the rotor.

The radial depth of the laminated core 6 between the bottom of the commutated winding slot 5 and the tops of the squirrel cage winding slots 9 is made sufficiently great to allow the entire normal rotor flux to pass between the two rotor windings at starting without excessively saturating this portion of the rotor. That is, the depth of this intervening magnetic flux path should be great enough so that if all the rotor iron lying radially inside the squirrel cage slots were cut away, the maximum magnetic flux density in the laminated core 6 would not exceed, with the present day quality of magnetic sheet iron, about 110,000 lines per sq. in. This feature of avoiding excessive saturation at starting I consider to be essential to my invention.

In the pure induction motor a greater proportion of the total line voltage is consumed in the leakage reactance and resistance drop of the primary winding at starting than when running, due to the difference in the line current under these two conditions. Therefore, in such a motor the rotor flux increases with the speed. In the plain repulsion motor the flux at starting is not in line with the axis of the primary winding and consequently, a given flux induces a smaller voltage in the primary at starting than under running conditions, at which time the rotor flux has become rotating in character rather than uniaxial. As also the repulsion motor starting current and therefore the primary leakage impedance voltage drop is not so great as in an induction motor the rotor flux will actually decrease with an increase in speed, assuming a norman brush position. In my improved motor, which is a combination induction and repulsion motor, the normal rotor flux remains fairly constant at all speeds. The rotor flux of my improved motor will however take different paths through the rotor as the speed changes. At starting the flux path will be largely across several rotor teeth between the two rotor windings and at running speed will be largely parallel with the rotor teeth passing down through the magnetic paths between the squirrel cage bars. The established principles of design require that the magnetic path between the squirrel cage bars be sufficient to prevent excessive saturation at running speed and in order to leave sufficient magnetic material in this space without wasting valuable rotor space at the periphery and still permit the low resistance squirrel cage bars to be placed well below the commutated winding, I find it desirable to make the squirrel cage bars of my improved motor in the elongated sector shape illustrated with the wide part of the sector toward the periphery. In this way the entire rotor space is utilized to the best advantage.

In Fig. 8 at OBD I have represented the saturation curve of the flux path between the two rotor windings of my improved motor and at OB'D' the saturation curve of a corresponding flux path in a motor where this path is of such dimensions that saturation is allowed to occur at starting. On curve OBD I have designated a point A which approximately corresponds to the state of saturation of this flux path of my improved motor due to the small part of the operating flux of the motor which passes therethrough near synchronous speed and a point B fairly low down on the knee of the curve which approximately corresponds to the state of saturation which this path has at starting when nearly all of the flux passes therethrough. The point B' on the dotted line curve OB'D' indicates the condition of saturation of a corresponding flux path in a poorly designed motor at starting where excessive saturation is allowed to occur. The point B' is considerably above the knee of the curve OB'D' although it represents the same amount of total flux as point B on the full line curve. By drawing the horizontal line CBB' parallel to the base we may express the relation between the squirrel cage reactances of the two motors at starting as follows: For my improved motor $\frac{CO}{CB}$ and for the poorly designed motor $\frac{CO}{CB'}$. Any decrease in the squirrel cage reactance of such a motor at starting due to saturation of the flux path permits an undesirable increase in starting current without producing a proportionate increase in starting torque. It will be seen from an inspection of Fig. 8 that the reluctance of the magnetic path between the two rotor windings of my motor is substantially constant at all speeds. Excessive saturation of the flux path between the two rotor windings is avoided and the motor starting current is therefore utilized to the fullest extent in producing torque. Another way of expressing the reasons for placing the squirrel cage winding well below the commutated winding is as follows: The ratio of the starting torque to the starting current increases with the leakage reactance of the squirrel cage, making it desirable to make the leakage reactance as large as other considerations will allow. With a sufficiently high squirrel cage reactance, the flux threading the space between the squirrel cage and commutated windings at starting will be under some conditions, depending upon the angle of brush shift, fully as high as the normal operating flux of the motor through the air gap; while if the depth is not sufficiently great, the iron will saturate at starting and thus the reactance will be reduced below its value at operating speeds, resulting in a higher starting current and a lower ratio of torque to current. In large size motors built in accordance with my invention, it may sometimes be desirable to use some form of a starting compensator or its equivalent. If the motor is designed with this in view, the depth of the magnetic bridge may be decreased in about the same proportion as the starting flux of the rotor will be decreased due to the voltage drop in the compensator. Certain of the appended claims are intended to cover such constructions.

In this specification I have laid particular emphasis on the flux density of the magnetic bridge separating the two rotor windings. It should be noted, however, that the other portions of the rotor flux path are so proportioned with respect to the bridge path as to be utilized to the fullest extent; that is to say, the flux density of the rotor teeth and the iron path lying beneath the squirrel cage is made as high as is consistent with the established principle of efficient motor design, and when I speak of the "normal operating flux" in the appended claims I refer to a flux of such magnitude as to produce in the rotor teeth a flux density of the order desirable for efficient motor design.

The second essential feature of my invention is to provide some means of making the flux path between the two rotor windings of sufficient reluctance to cause the desired proportion of the rotor flux to pass beneath the squirrel cage at running speeds. This is preferably accomplished as illustrated in Fig. 2 by connecting each squirrel cage slot with the corresponding commutated winding slot by a narrow slit 12. The radial slits 12 or some alternative arrangement for accomplishing the same result is essential in order to obtain any appreciable benefit from the squirrel cage winding in normal operation. For, if no air gap in the flux path existed or if some other equivalent arrangement for accomplishing the same purpose were not provided, the extremely low reluctance of the iron at low densities would allow practically all the flux to pass above the squirrel cage during normal operation, giving no improvement in the speed regulation over the series characteristics of the plain repulsion motor. The reason for making the slits or air gaps 12 so small is that the squirrel cage current at starting must be sufficient to force the desired proportion (nearly all) of the flux across the gaps 12. A large gap would require an excessively large squirrel cage current and consequently, a large starting current drawn from the line. The gaps 12 must also not be too small, for if so, too small a proportion of the total flux will link the squirrel cage under operating conditions resulting in poor speed regulation. It has previously been stated that the reluctance of the flux path between the two rotor windings is substantially constant both at starting and at normal speeds because excessive saturation of this path is not allowed to occur. The reluctance of the closed iron path below the squirrel cage is very small and may be neglected in comparison with the effect of the armature reaction produced by the squirrel cage current. The effective reluctance of this path is therefore nearly entirely due to the squirrel cage current and is substantially proportional thereto. This effective reluctance is greater at starting than at normal speed due to the variation of squirrel cage current with speed. It will thus be seen that by making the reluctance of the bridge path considerably greater than the actual reluctance of the path beneath the squirrel cage but less than the "effective" reluctance of this path at starting the major portion of the operating flux will be forced to pass between the two windings at starting but will shift so as to pass beneath the two windings as synchronous speed is approached when the current in the squirrel cage drops off to a normal speed value, which is dependent upon the motor load. Bearing in mind that excessive saturation of the flux path between the two rotor windings must not occur, it follows from the above considerations that the width of gaps 12 also bear a definite relation to the relative load carrying capacities of the two rotor windings for if it is desired to obtain more pronounced induction motor characteristics the squirrel cage will be designed to carry a greater proportion of the load and the width of air gaps 12 will be increased proportionately. The load capacity of the squirrel cage is really measured by its leakage reactance and is inversely proportional thereto. This leakage reactance is principally due to the bridge or flux path between the two rotor windings, and may roughly be said to be proportional to the ratio of the bridge depth to width of the air gap therein. By making this ratio smaller, therefore, we lower the reactance, increase the squirrel cage load capacity and decrease the starting torque per ampere. It will therefore be evident that we cannot go very far in this direction without losing the desirable starting characteristics produced by the commutated winding. The choice of the width of the air gap 12 is a delicate matter in design and a difference of only a few thousandths of an inch is easily noticeable in the changed characteristics caused thereby. It may be said that the width of the air gap in the bridge separating the two rotor windings is so chosen as to make the squirrel cage ampere turns required to force substantially the full starting flux of the motor through the bridge equal to from one to three times full load current flowing in the primary winding. In other words, the width of the air gap should be so chosen that when the brushes are raised from the commutator and full voltage is applied to the motor terminals with the rotor stationary, from one to three times, and preferably about two times full load current is drawn from the line. Of course, enough flux must pass beneath the squirrel cage to produce this current but this flux, which is at line frequency when the rotor is stationary with respect to the primary, is only a small proportion of the total. Usually a very small gap width, about 1/20th to 1/40th of the depth of the bridge, is derived from the above consideration. If the magnetizing current of the motor is exceptionally large, as in the case of a low speed motor, the percentage of the primary current which is reflected in the squirrel cage is reduced, and therefore the percentage of full load current drawn from the line with the brushes raised and the rotor stationary may be considerably more than the percentage of full load primary ampere turns required in the squirrel cage to force substantially the full flux of the motor across the bridge. Viewing the invention in the light of the foregoing discussion, it will be seen that it is not limited to any definite width of the slit 12 or to any definite ratio between the width of slit 12 and the depth of the flux path between the two rotor windings as it will be evident to those skilled in the art that it will be convenient and often desirable to alter these dimensions to some extent in order to obtain motor characteristics best suited for a given application.

In Fig. 4 I have illustrated a thin, flat high resistance non-magnetic conductor 13 which will be the same length as the rotor and of such cross sectional dimensions as to fit in the thin radial slit 12 between the two rotor windings. When it is desirable to obtain the benefits of these members in improving the commutation, they will be placed in most of the slits 12 and preferably in all. These members may be anchored in slots 9 if desired.

In commutation, without any artificial means of improvement, the energy of the slot field of the commutated winding current is released by the current change and absorbed principally at the brush commutator contacts as sparking. If the dissipation of the energy be transferred to some other point than the brush commutator contact, commutation is improved. With a close inductive link between the commutated winding and an adjacent low resistance conductor, for example, a squirred cage winding, this end is served because a current is induced in the squirrel cage partly compensating in magnetizing force the change in current of the commutated winding, thus dissipating a part of the energy in the squirrel cage instead of in the brush contacts. This end is served in my improved motor to some extent when the conductors 13 are omitted. However, due to the considerations previously explained the squirrel cage of my improved motor although of low resistance is not closely linked with the commutated winding and altho the commutation thereof without the use of the eddy current conductor 13 is far superior to that of the ordinary alternating current commutator motor, I find it desirable in some instances to include the eddy current conductor 13 or some equivalent arrangement for the sole purpose of improving the commutation. When so used, the metal strips 13 serve the purpose of damping out the high frequency flux pulsations passing between the two rotor windings on account of the formation of eddy currents in said slits and thus the leakage between the two windings at commutation frequency is reduced in the same proportion. In other words, the strips serve to more closely link the two windings in so far as commutation is concerned. I accomplish this result without affecting the other desirable characteristics of the motor previously explained and the reason why the strips 13 may thus form the seat of eddy currents which help commutation without appreciably affecting the other characteristics of the motor is that the flux pulsations produced by the commutation current reversals occur at a much higher frequency than any of the other predominating flux pulsations set up in the magnetic circuit of the rotor, and because the law of the increase of eddy current effects with frequency is of such a nature as to permit a very considerable result to be attained at a frequency only five or six times another frequency at which the eddy currents are negligible. The lower predominating flux pulsations above referred to are the slip and so-called double frequency flux pulsations common to this type of motor. The frequency of commutation at normal speed is usually ten or more times the line frequency. It is desirable to so proportion the eddy current wedges 13 as to make the eddy currents negligible up to double line frequency but of considerable magnitude at commutation frequency. This is possible as shown by the physical laws of eddy currents described by Field in Vol. XXIV of the Proceedings of the Institute of Electrical Engineers for 1905 and by other writers. I have found that if I make the eddy currents strips 13 of phosphor bronze and just wide enough to fit snugly in the radial slits 12 that they are effective in perfecting commutation but do not change any of the other characteristics of the motor to any noticeable extent. If the laws above referred to are disregarded, as, for example, by the use of a very low resistance eddy current conductor, commutation would be corrected, but also the operating characteristics of the motor would be interfered with, and additional and unnecessary $I^2R$ losses would be caused thereby. It is not essential however to use this particular arrangement of the eddy current bars for improving commutation.

There are other alternative constructions of the motor for obtaining the various characteristics previously described. In Fig. 5 I have illustrated one such construction in which the opening in the laminations between the two rotor windings is stamped out to a greater width than desired and then filled up to the required width with magnetic material such as by the folded sheet of steel 14 leaving an air gap 15 of the required width. The steel sheet 14 may be anchored in the squirrel cage slot as at 16. Eddy currents will be produced in the unlaminated sheet 14 for commutation correction purposes. The air gap 15 may be filled up with an insulator such as horn fibre, if desired, and several separate sheets of magnetic material may be used instead of the folded piece 14. I have found that the structure illustrated in Fig. 5 gives slightly less desirable motor characteristics than the structures of Figs. 2 and 3. This I believe to be due to the production of unnecessary eddy currents in the steel sheet 14.

Another modification which will give good results but which will cost more to construct, is shown in Fig. 6. Here a rather wide slot is punched in the rotor laminations between the squirrel cage and commutated winding slots and is filled up with a U-shaped tube 17 extending parallel to the shaft and consisting of a high resistance nonmagnetic conductor, such as phosphor bronze. The tube is filled with laminated magnetic material 18 stacked the same way as the rotor laminations. The tube 17 might also be rectangular and closed at the top. The material which is punched out of the rotor laminations to form this intermediate slot may be used in the tube if cut down to provide the necessary air gap. Fig. 7 illustrates the tube removed from the slot with a portion broken away to expose the laminated interior. If the sum of the two air gaps formed by the sides of tube 17 is about equal to the air gap of the slit 12 in Fig. 3, the results obtained will be similar. However, the construction of Fig. 6 will be more costly. Where I have referred to the "air gap" or "opening" in the "flux path" or magnetic bridge in the specification and claims, I refer to such openings irrespective of whether they are filled up with nonmagnetic material or not.

In all of the modifications thus far illustrated the three corresponding slot openings in the rotor have the same radial center lines which is preferable from a construction standpoint but does not affect the principles of design. For instance, similar operating characteristics would be obtained if the slits 12 of Fig. 2 were placed in line with one edge of the rotor slots instead of at the center. Other modifications for producing the desired result will occur to those skilled in the art and I therefore do not wish to be limited to the particular structures illustrated.

In Fig. 9 I have illustrated characteristic curves obtained from a test of a 2 H. P., 4-pole, 220 volts, 60 cycles, single phase motor connected as illustrated in Fig. 1 and designed according to Figs. 2 and 3. The brushes 7 were shifted 35 degrees from the axis of the stator winding. The squirrel cage was made of aluminum and cast in place. The rotor was 7 inches in diameter and provided with 36 evenly spaced slots. The depth of the flux path between the two rotor windings was .5625 inches and the distance from the periphery to the bottom of the squirrel cage winding slots was 1.875 inches. The minimum width of the rotor teeth between the commutated winding slots was .20 inches and the width of the slits 12, .022 inches. The other general proportions were as illustrated in Fig. 10. In Fig. 9, efficiency, power factor, line current and speed are plotted against torque in foot-pounds. From these curves it will be seen that the speed regulation of my improved motor is better than 5% and between no load and 190% load the speed regulation is better than 10%. The starting torque is better than 300% with only four times full load starting current. The power factor at full load is 96% and is still better at 1½ loads. Full load efficiency is 78%. These desirable characteristics combined in a single motor of this type make it far superior to any other single phase motor of which I am aware, where spacial starting connections and compensating windings are not provided. The motor was tested with and without the phosphor bronze strips 13 with no noticeable difference in the characteristics except commutation. With the phosphor bronze strips 13 inserted, the commutation was perfect up to and beyond 200% load, and only a very small amount of sparking was noticeable when the eddy current strips 13 were omitted. I therefore consider that I may very well omit the eddy current conductors in many cases, but that in other cases it may be desirable to utilize the benefits of the eddy current conductors for improving commutation. A normal load heat run was made on this motor and the maximum temperature rise obtained was 35 deg. C. A rise of 50 deg. C. is allowed by the approved standardization rules, and I therefore believe that this particular motor, although designed for 2 H. P. using prior design constants as a guide, may be rated at 2½ H. P. by raising the density. The low temperature rise obtained also substantiates the statement previously made that the rotor losses are small and that the rotor construction which permits the laminations to extend to the shaft unbroken by air ducts, in order to utilize the rotor space to the fullest extent, is entirely practical.

It is well known that in general the functions of the rotor and the stator of a motor can be interchanged without modifying the mode of operation of the machine. It will be understood, therefore, that by the word "rotor" as used in the specification, and claims, I mean the induced member of the motor.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other arrangements.

What I claim as new and desire to secure by Letters Patent of the United States, is:—

1. A laminated rotor for an alternating current dynamo electric machine having a repulsion motor winding and a permanently short-circuited winding, a flux path between said windings of sufficient capacity to permit the normal operating flux of the machine to thread the same without excessive saturation and of such reluctance as to cause a portion of said flux to pass beneath said windings.

2. A laminated rotor for an alternating current dynamo electric machine having a repulsion motor winding and a permanently short-circuited winding, a flux path between said windings of sufficient capacity to permit the normal operating flux of the machine to thread the same without excessive saturation and of such reluctance, the major portion of which is due to an air gap, as to cause a portion of said flux to pass beneath said windings.

3. A laminated rotor for an alternating current dynamo electric machine having a commutated winding in peripheral slots and a squirrel cage winding in slots situated beneath said commutated winding slots, said two sets of slots being separated by a slotted magnetic bridge formed by the rotor laminations, the depth of the bridge being sufficient to pass the operating flux of the machine at starting without excessive saturation and the opening or openings in said bridge being sufficient to cause a major proportion of the normal operating flux of the machine to pass beneath said squirrel cage windings at normal speed.

4. An alternating current motor comprising cooperating stator and rotor elements, said rotor element comprising a cylindrical core of laminated material having a commutated winding in peripheral slots and a squirrel cage winding situated in slots below said first mentioned slots, said two sets of slots being separated by a slotted magnetic bridge formed by the rotor laminations, the depth of the bridge being sufficient to pass the normal operating flux of the motor without excessive saturation and the opening therein being sufficient to cause a portion of said flux to thread said squirrel cage winding.

5. A laminated rotor for an alternating current dynamo electric machine of a type in which the rotor flux remains substantially constant under starting and running conditions, two windings for said rotor, one of which is permanently short-circuited, said windings being separated by a flux path of substantially constant reluctance under all operating conditions which path is of greater actual reluctance than that of the flux path beneath both of said windings.

6. An alternating current motor comprising cooperating primary and secondary elements, said secondary element comprising a laminated magnetic member having a commutated winding in slots adjacent said primary member and a squirrel cage winding below said commutated winding, said two secondary windings being separated by a flux path having a substantially constant reluctance under all operating conditions which path is of considerably greater actual reluctance than that of the flux path beneath said squirrel cage.

7. A secondary member for an alternating current dynamo electric machine of the type provided with commutated and squirrel cage windings having paths for the operating flux of the machine between and beneath said windings, characterized by the fact that the path between said windings is of sufficient flux carrying capacity to make the reluctance thereof substantially independent of saturation effects at all speeds and is designed to have a reluctance greater than the actual reluctance of the flux path beneath said windings, but less than the effective reluctance of the path beneath said windings under starting conditions, where the series characteristics of the commutated winding predominate at starting and the shunt characteristics of the squirrel cage winding predominate at normal speed.

8. A laminated rotor for an alternating current dynamo electric machine having a commutated winding and a squirrel cage winding with two parallel paths through said rotor both of said paths being of sufficient capacity to carry the normal operating flux of said machine without excessive saturation, one path threading only the commutated winding and the other path threading both of said windings, the effective reluctances of said paths being such that the greater proportion of said flux threads only the commutated winding at starting and threads both of said windings at normal speed.

9. An alternating current motor comprising cooperating primary and secondary members, an exciting winding on said primary member, a commutated winding situated in peripheral slots and a low resistance squirrel cage winding situated in slots below said commutated winding on said secondary member, a magnetic flux path of sufficient capacity to carry the normal operating flux of the motor without excessive saturation separating said two secondary windings and openings in said flux path of such width that when the commutated winding is inactive and normal voltage is applied to the primary exciting winding with the rotor blocked, from one to three times and preferably about two times full load current flows in said primary winding.

10. A laminated rotor for an alternating current motor having a commutated winding and a squirrel cage winding, two parallel paths through said rotor for the normal operating flux of said motor, one path threading only the commutated winding and the other path threading both of said windings, the comparative reluctances of said paths being such that the proportion of the normal operating flux which threads only the commutated winding is substantially proportional to the current in the squirrel cage winding.

11. A laminated rotor for an alternating current dynamo electric machine having a commutated winding in peripheral slots and a permanently short circuited winding situated in slots below said commutated winding slots, said two sets of slots being separated by a magnetic bridge of sufficient depth to carry the normal operating flux of the motor without excessive saturation and a narrow air gap in said bridge, the ratio of the width of said air gap to the depth of said bridge being within 1 to 20 and 1 to 40.

12. A laminated rotor for an alternating current motor of the type provided with a commutated winding at the surface of the rotor and a squirrel cage winding beneath said commutated winding, said two sets of windings being separated by a magnetic bridge, characterized by the fact that said magnetic bridge is provided with a narrow opening and is of just sufficient depth as to make the leakage inductance of the squirrel cage substantially constant under starting and running conditions.

13. A rotor for an alternating current motor having a commutated winding in peripheral slots and a squirrel cage winding situated in slots beneath said commutated winding slots, the ratio of the load carrying capacities of said commutated and squirrel cage windings being in the neighborhood of 3 to 1, said squirrel cage winding bars being sector shaped with the large part of the sector toward the periphery of the rotor and separated from each other and from said commutated winding by magnetic bridges of just sufficient capacity to respectively carry the running and starting fluxes of the motor without excessive saturation, the reluctances of the magnetic bridges between the squirrel cage and commutated windings being considerably greater than the reluctances of the bridges between said squirrel cage bars.

14. In a dynamo electric machine of the commutator type a conductor closely associated with the commutated winding of said machine which conductor is appreciably inductively responsive only to flux pulsations corresponding to those having a frequency not appreciably lower than the frequency of commutation at normal speed.

15. In an alternating current dynamo electric machine of the commutator type, an open circuited eddy current conductor situated within the leakage field of the commutated winding, said conductor being appreciably responsive only to flux pulsations corresponding to those of commutation frequency or above.

16. In an alternating current commutator motor and eddy current conductor situated adjacent the commutated winding, said conductor being appreciably inductively responsive only to flux pulsations having a frequency above double line frequency.

17. An alternating current motor comprising cooperating stator and rotor elements, said rotor element comprising a cylindrical core of laminated material having a commutated winding in peripheral slots and a squirrel cage winding situated in slots below said first mentioned slots, said two sets of slots being separated by a slotted magnetic bridge formed by the rotor laminations, the depth of the bridge being sufficient to pass the normal operating flux of the motor without excessive saturation and the opening therein being sufficient to cause a portion of said flux to thread said squirrel cage winding and a commutation correcting eddy current conductor in said opening which is nonresponsive to the normal operating fluxes of said motor.

18. A rotor for an alternating current dynamo electric machine of the type provided with a permanently short circuited winding situated below a commutated winding, characterized by the fact that said two windings are separated by flux screening conductors responsive only to the rotor flux pulsations due to commutation.

19. A single phase alternating current commutator motor provided with a squirrel cage winding beneath the commutated winding, said two windings being separated by a flux path of sufficient capacity to carry the normal operating flux of the motor without excessive saturation and a flux screen in said path responsive only to flux pulsations having a frequency above double the motor frequency.

20. A single phase alternating current motor provided with a primary member having a single distributed exciting winding and a secondary member having a commutated winding and a permanently short circuited winding, said two secondary windings being separated by a flux path of sufficient capacity to carry the normal operating flux of the motor without excessive saturation and of such reluctance as to cause the proportion of said flux which threads the same to be substantially proportional to the current in said permanently short circuited winding.

21. A laminated rotor for an alternating current dynamo electric machine having peripheral teeth and slots, a commutated winding in said slots, a squirrel cage winding situated in slots below said peripheral slots, said two sets of slots being separated by magnetic bridges each provided with a narrow air gap, the cross sectional area of said bridges being greater than the cross sectional area of said teeth.

In witness whereof I hereunto set my hand this 30th day of June, 1922.

SVEN R. BERGMAN.